United States Patent [19]
Davin

[11] Patent Number: 5,168,390
[45] Date of Patent: Dec. 1, 1992

[54] DYE LASER AMPLIFIER INCLUDING A DYE CELL CONTAINED WITHIN A SUPPORT VESSEL

[75] Inventor: James Davin, Gilroy, Calif.

[73] Assignee: The United States of America as represented by the United States Department of Energy, Washington, D.C.

[21] Appl. No.: 911,272

[22] Filed: Sep. 22, 1986

[51] Int. Cl.$^5$ ................................ H01S 3/02
[52] U.S. Cl. ........................ 359/333; 372/54
[58] Field of Search ............... 372/54, 51, 53; 330/4.3

[56] References Cited

U.S. PATENT DOCUMENTS

| | | | |
|---|---|---|---|
| 3,663,891 | 5/1972 | Kocher et al. | 372/54 |
| 3,678,410 | 7/1972 | Kocher et al. | 372/54 |
| 3,688,216 | 8/1972 | Kocher et al. | 372/54 |
| 3,717,825 | 2/1973 | Gerlach | 372/54 |
| 3,984,786 | 10/1976 | Pike | 372/54 |

Primary Examiner—Mark Hellner
Attorney, Agent, or Firm—Miguel A. Valdes; Henry P. Sartorio; William R. Moser

[57] ABSTRACT

A large (high flow rate) dye laser amplifier in which a continous replenished supply of dye is excited by a first light beam, specifically a copper vapor laser beam, in order to amplify the intensity of a second different light beam, specifically a dye beam, passing through the dye is disclosed herein. This amplifier includes a dye cell defining a dye chamber through which a continuous stream of dye is caused to pass at a flow rate of greater than 30 gallons/minute at a static pressure greater than 150 pounds/square inch and a specifically designed support vessel for containing the dye cell.

9 Claims, 3 Drawing Sheets

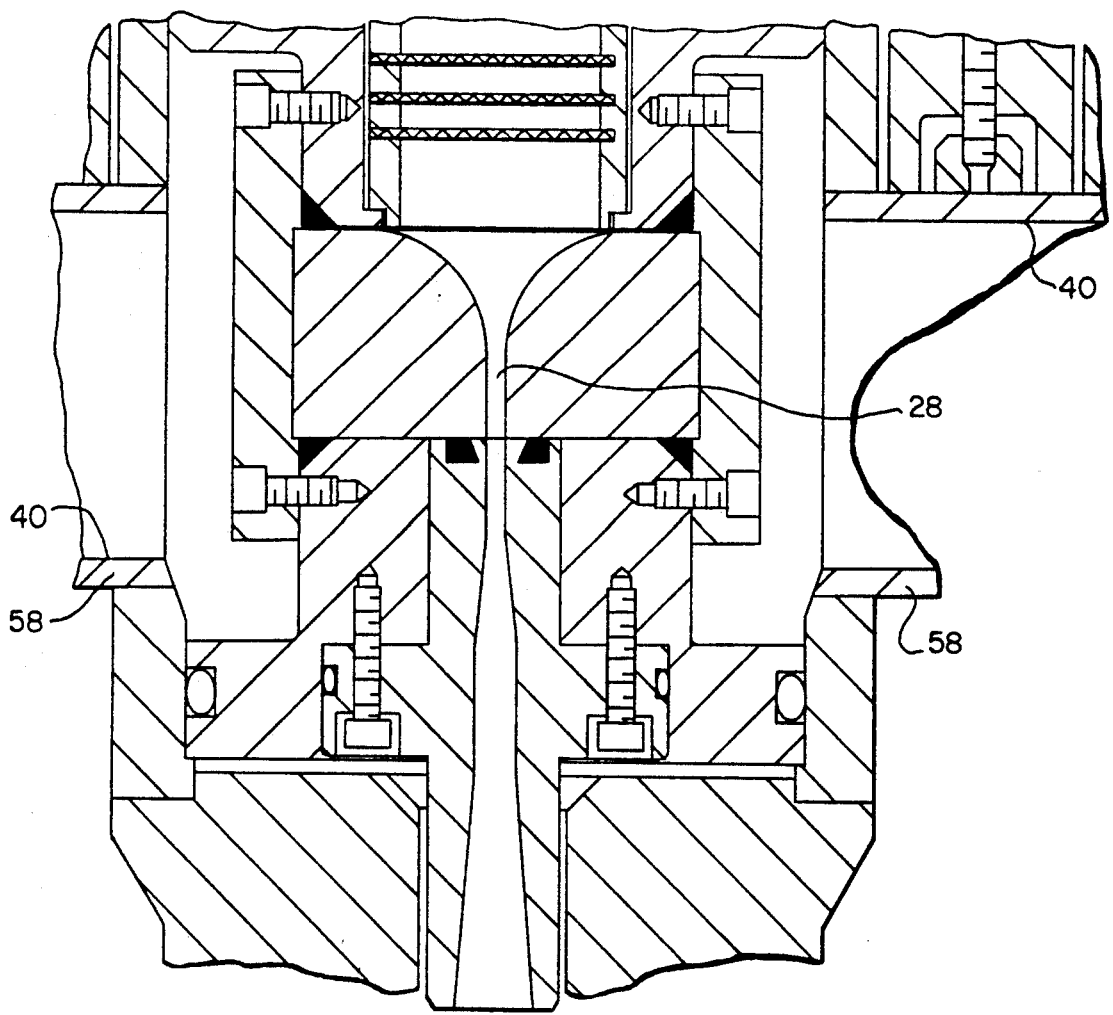
FIG. — 6
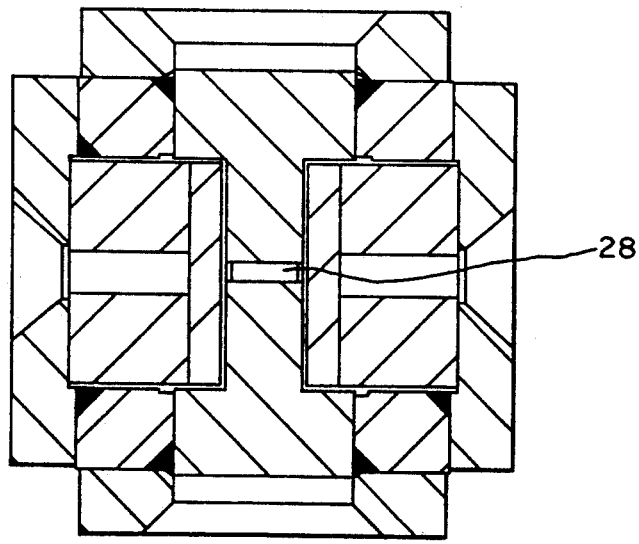
FIG. — 5

DYE LASER AMPLIFIER INCLUDING A DYE CELL CONTAINED WITHIN A SUPPORT VESSEL

The United States Government has rights in this invention pursuant to contract number W-7405-ENG-48 between the United States Department of Energy and the University of California for the operation of the Lawrence Livermore National Laboratory.

BACKGROUND OF THE INVENTION

The present invention relates generally to a dye laser amplifier including a dye cell assembly having an internal chamber in which a continuous replenished supply of dye solution at high velocity is excited by a first light beam in order to amplify the intensity of a second, different light beam passing through the dye and more particularly to a specifically designed support vessel for containing the dye cell assembly.

When a dye laser amplifier of the general type just recited is designed to operate at relatively a low velocity, flow rate and supply static pressure, for example on the order of 140 feet/second, 10 gallons/minute and 100 pounds/square inch, its associated support structure and particularly the way in which its dye cell assembly is supported can be integral in design and readily provided due to the small size and small forces of the tubing required to supply the dye solution relative to the size of the dye cell assembly. However, the support structure for a large dye laser amplifier, for example one designed to operate at velocities greater than 170 feet/second, flow rates greater than 30 gallons/minute and apply static pressure greater than 150 psi, is more complicated and not as readily providable due to the large size of the supply piping and larger reaction forces of the flowing dye solution relative to the size of the dye cell assembly. As will be seen hereinafter, the present invention is directed to a particularly designed, uncomplicated and yet reliable support vessel for large dye laser amplifiers.

SUMMARY OF THE INVENTION

In view of the foregoing, it is an object of the present invention to provide an uncomplicated and yet reliable support vessel for containing the dye cell forming part of a dye laser amplifier in which a continuous replenished supply of dye solution at high velocity is excited by a first light beam in order to amplify the intensity of a second different light beam passing through the dye.

A more particular object of the present invention is to provide a sport vessel which is cop act, rigid and acts as a flow conditioner especially suitable for containing a dye cell assembly forming part of a large (high flow rate high velocity, high pressure) dye laser amplifier.

Another particular object of the present invention is to provide a support vessel which is of the last mentioned type and which provides a combination settling and thermal mixing chamber through which a stream of dye passes before it enters the dye cell forming part of the overall dye laser amplifier.

Still another particular object of the present invention is to provide a support vessel which is of the last mentioned type and which contains its associated dye cell assembly in a rigid and a non-structural manner, whereby the dye cell assembly can be isolated from any large loads due to structure or hydromyanic forces generated by the attached piping or large mass flow rates of the dye solution. This also allows the dye cell assembly to be simply inserted into the vessel and removed from it.

Yet another particular object of the present invention is to provide a support vessel which is of the last mentioned type and which generates relatively low hydrodynamic loads which must be resisted by the overall amplifier support structure despite large differences in its inlet and outlet static pressures.

As indicated above, the support vessel disclosed herein forms part of an overall dye laser amplifier including a dye cell defining a dye chamber in which a continuous replenished supply of dye solution at high velocity is excited by a first light beam in order to amplify the intensity of a second different light beam passing through the dye. The vessel includes a first opening for accommodating passage of the first beam into the dye chamber, a pair of second openings for accommodating the passage of the second beam through the dye chamber, and means defining a vessel chamber through which the continuous stream of dye must pass before entering the dye cell. The vessel also includes an inlet for accommodating passage of the stream into the vessel chamber before entering the dye cell and an outlet for accommodating passage of the stream out of the vessel after leaving the dye cell.

In accordance with one aspect of the present invention, the vessel chamber just recited is substantially larger in cross-section than both the vessel inlet and the dye chamber and substantially larger in volume then the volume of the dye chamber, whereby to serve as a settling and thermal mixing chamber for the stream of dye as the latter enters the vessel from its inlet and before it enters the dye cell.

In accordance with a second aspect of the present invention, the dye cell assembly is contained within the vessel, in its operating position, in an entirely non-structural manner so that it can be isolated from any externally generated loads and readily inserted into position and removed therefrom without having to connect the dye cell assembly to the vessel in a rigid structural manner. This is particularly advantageous because of the relatively small size and non-rigid structural design and fragile nature of the dye cell assembly as compared to the potentially large forces associated with piping and hydrodynamic forces.

Still another aspect of the present invention relates to the fact that the overall dye laser amplifier is intended to operate at a relatively high flow rates and flow velocity, for example greater than 30 gallons/minute and greater than 170 feet/second, and therefore is subjected to relatively high static pressures at its vessel's inlet and outlet. Moreover, because there is a substantial pressure drop across the vessel (through the dye cell) due to the high velocity dye solution in the region of amplification, the static pressure at the inlet is substantially greater than the static pressure at the outlet. In accordance with this aspect of the present invention, the inlet and outlet are configured to take into account these differences in static pressure such that the static forces at the vessel's inlet and outlet, which result from the static pressures, are substantially equal in magnitude, opposite in direction and co-linear to one another, whereby to substantially cancel one another out vectorally. This substantially reduces the hydrodynamic load placed on the support structure.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall dye laser amplifier disclosed herein and particularly its support vessel will be described in more detail hereinafter in conjunction with the drawings wherein:

FIG. 5 is a sectional view taken generally along section 5—5 in FIG. 4; and

FIG. 6 is a sectional view taken generally along line 6—6 in FIG. 4.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
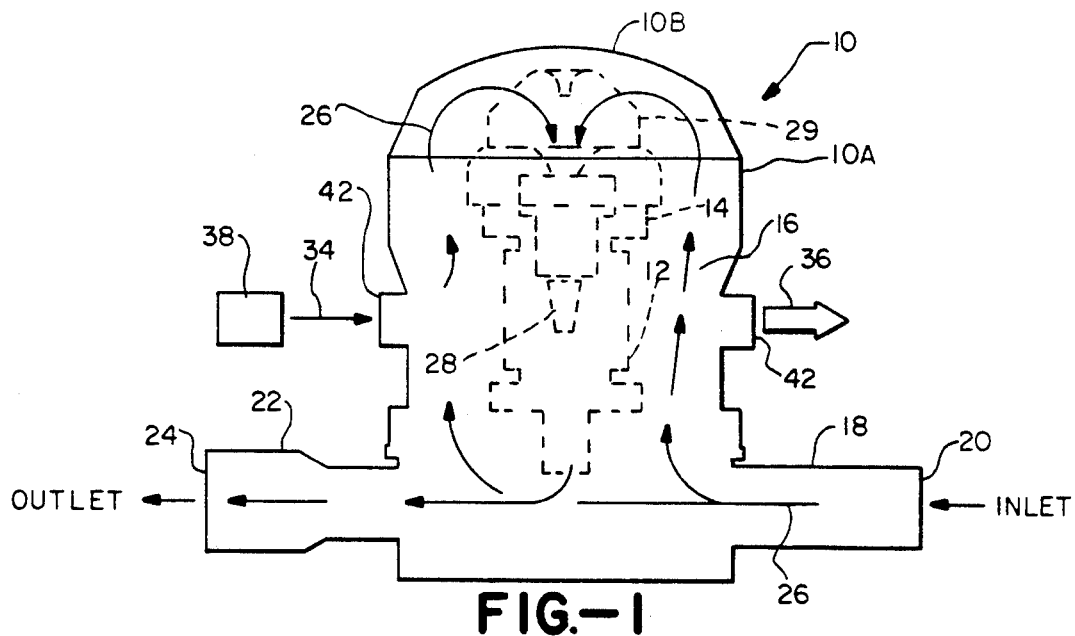
FIG. 1 is a diagrammatic illustration, in side elevational view, of a support vessel which forms part of an overall dye laser amplifier and which is designed in accordance with the present invention.
Figure 2:
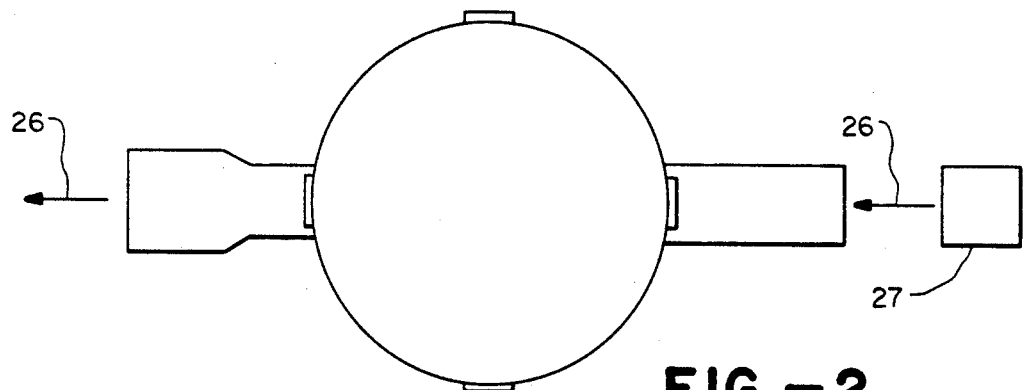
FIG. 2 is a top plan view of the support vessel illustrated in FIG. 1.
Figure 3:
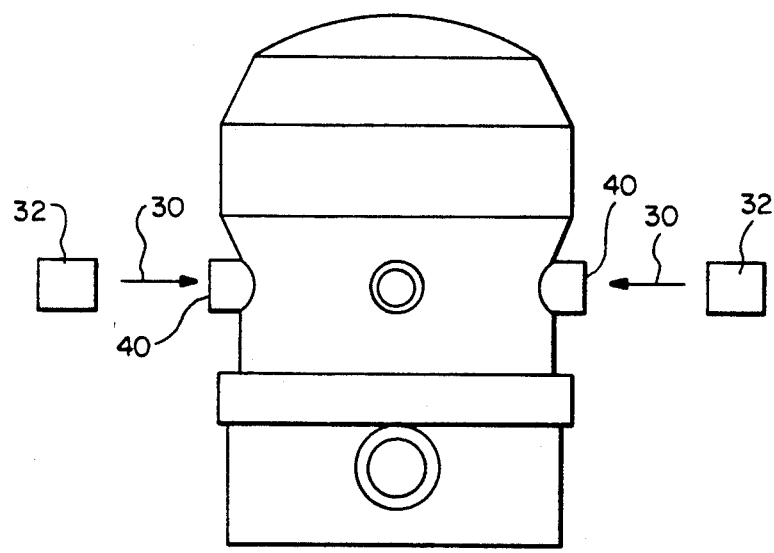
FIG. 3 is a front end elevational view of the support vessel illustrated in FIG. 1.

Turning now to the drawings, wherein like components are designated by like reference numerals throughout the various Figures, attention is first directed to FIGS. 1-3 illustrating a support vessel 10 which forms part of an overall dye laser amplifier pressure vessel and which is designed in accordance with a number of different aspects of the present invention. As indicated previously, the dye laser amplifier includes a dye cell assembly defining a dye chamber in which a continuous replenished supply of dye solution is excited by a first light beam in order to amplify the intensity of a second different light beam passing through the dye. The dye cell assembly is shown in FIG. 1 by dotted lines at 12 and forms part of an overall dye cell assembly 14 contained entirely within an internal chamber 16 defined by the support vessel. The vessel also includes pipe means 18 defining an inlet 20 into the vessel and pipe means 22 defining an outlet 24 out of the vessel. The inlet 20 is designed to accommodate passage of the above recited dye stream into vessel chamber 16 before entering the dye cell assembly and outlet 24 is designed to accommodate passage of the dye stream out of the vessel. The dye stream itself is diagrammatically represented by the arrows 26 in FIG. 1 along with suitable means 27 for producing the dye stream. As will be described hereinafter with regard to FIGS. 4-6, the dye stream initially enters vessel chamber 16 after it first passes through inlet 20 and thereafter flows into and through dye cell 12 including specifically its dye chamber which is diagrammatically shown at 28 in FIG. 1. Thereafter, the stream flows through the bottom of the dye assembly and out of the support vessel through outlet 24.

As stated above, as dye stream 26 passes through dye chamber 28 at a high velocity, it is excited by a first light beam in order to amplify the intensity of a different second light beam. The first light beam is diagrammatically represented by the arrow 30 in FIG. 3 along with means generally indicated at 32 for producing that beam. In a contemplated embodiment of the present invention, the means 32 is a copper vapor laser and the beam is a copper vapor laser (CVL) beam. In that same contemplated embodiment, two such beams 30 are used to excite the dye along with two such means for producing the beam (or one means plus the appropriate optics). The second beam is shown in FIG. 1, first at 34 before it enters the dye cell and then at 36 in its amplified state after it passes through the dye cell. Means generally indicated at 38 for initially providing the beam 34 is shown in FIG. 1. Means 38 could be a dye laser oscillator or another dye amplifier. In any case, the support vessel itself includes a pair of first openings 40 for accommodating passage of beams 30 into dye chamber 28 and a pair of second openings 42 for accommodating the passage of beam 34, 36 through the dye chamber.

In accordance with one feature of the present invention, the vessel chamber 16 within support vessel 10 is substantially larger in cross-section than both the vessel inlet 20 and dye chamber 28 and substantially larger in volume than the volume of the dye chamber so as to serve both as a settling chamber and a thermal mixing chamber for the stream of dye as the latter enters the vessel from its inlet and before it enters the dye cell. In an actual embodiment, the area ratio between the vessel chamber 16 and dye cell chamber 28 is approximately 225:1. As a settling chamber, the vessel chamber serves to reduce the turbulence within the stream to a negligible value before it enters the dye cell. As a thermal mixing chamber, the vessel chamber serves to make the stream more uniform in temperature as it enters the dye cell. These are important features in the overall operation of the dye power amplifier. Regarding this latter feature, in order to maintain dye beam stability, it is important to keep the dye temperature fixed relative to a reference temperature (within one-tenth of a degree centigrade). If the dye deviates from that reference temperature within the dye chamber, the index of refraction of the dye will change, thereby causing the beam to steer. By adequately thermally mixing the stream just before it enters the dye cell, thermal deviation of the stream as it enters the dye chamber is kept to a minimum. Turbulence also effects the index of refraction of the dye and therefore must be kept to a minimum.

Another feature of the invention resides in the particular design of the support vessel 10 and the dye cell assembly 12 which allows the latter to be placed in its operating position within the support vessel without physically connecting the two together in a rigid structural manner, that is, other than by a cap arrangement which will be described hereinafter and which itself is readily removable. As will be seen hereinafter, the support vessel includes a main body 10A and a thread mounted top cap 10B which can be readily removed so as to expose vessel chamber 16 and an appropriately designed compartment for receiving and supporting the dye cell assembly 12 in its operating position, that is, in the position for receiving dye stream 26 for passage through dye chamber 28, for receiving dye beam 34 for passage through the dye chamber and for receiving the CVL beam or beams 30.

Still another feature of the present invention resides in the specific way in which the support vessel is designed so that it is subjected to relatively low hydrodynamic loads, even at relatively high flow rates (on the order of 250 gallons/minute) and relatively high static pressures at its inlet and its outlet. In fact, in an actual working embodiment, at its intended operating pressure, the static pressure at inlet 20 is approximately 900 psi and the static pressure at the outlet is approximately 500 psi which means that there is a 400 psi pressure drop across the vessel itself. If the inlet 20 and outlet 24 were the same size, which is typical, the resultant forces there would be substantially different and therefore unbalanced, resulting in relatively high hydrodynamic loads which must be resisted by the Dye Power Amplifier support structure. That is not the case with respect to vessel 10 because the inlet and outlet are not identical in cross-sectional area. In fact, they differ by an amount which makes the resultant force at each approximately equal to the other so as to provide a small moment in the direction of and carried by the support structure. This is possible since the force is equal to the static pressure multiplied by the inlet/outlet area. With the inlet displaying a static pressure of 900 psi and the outlet displaying a static pressure of 625 psi, the inlet pipe was designed to have a 2.50 inch diameter while the outlet pipe was designed to have a 3 inch diameter. Since the outlet static pressure can not always be precisely controlled with respect to the inlet static pressure due to the wide range of operating conditions possible, this embodiment greatly reduces the resultant hydrodynamic loads which must be resisted. In addition, the inlet and outlet pipe are positioned co-linear to one another and extend horizontally in a vertical plane which divides the vessel into two symmetrical halves. In that way, there are no resultant bending moments applied to the vessel and the resulting hydrodynamic loads are small.

Figure 4:
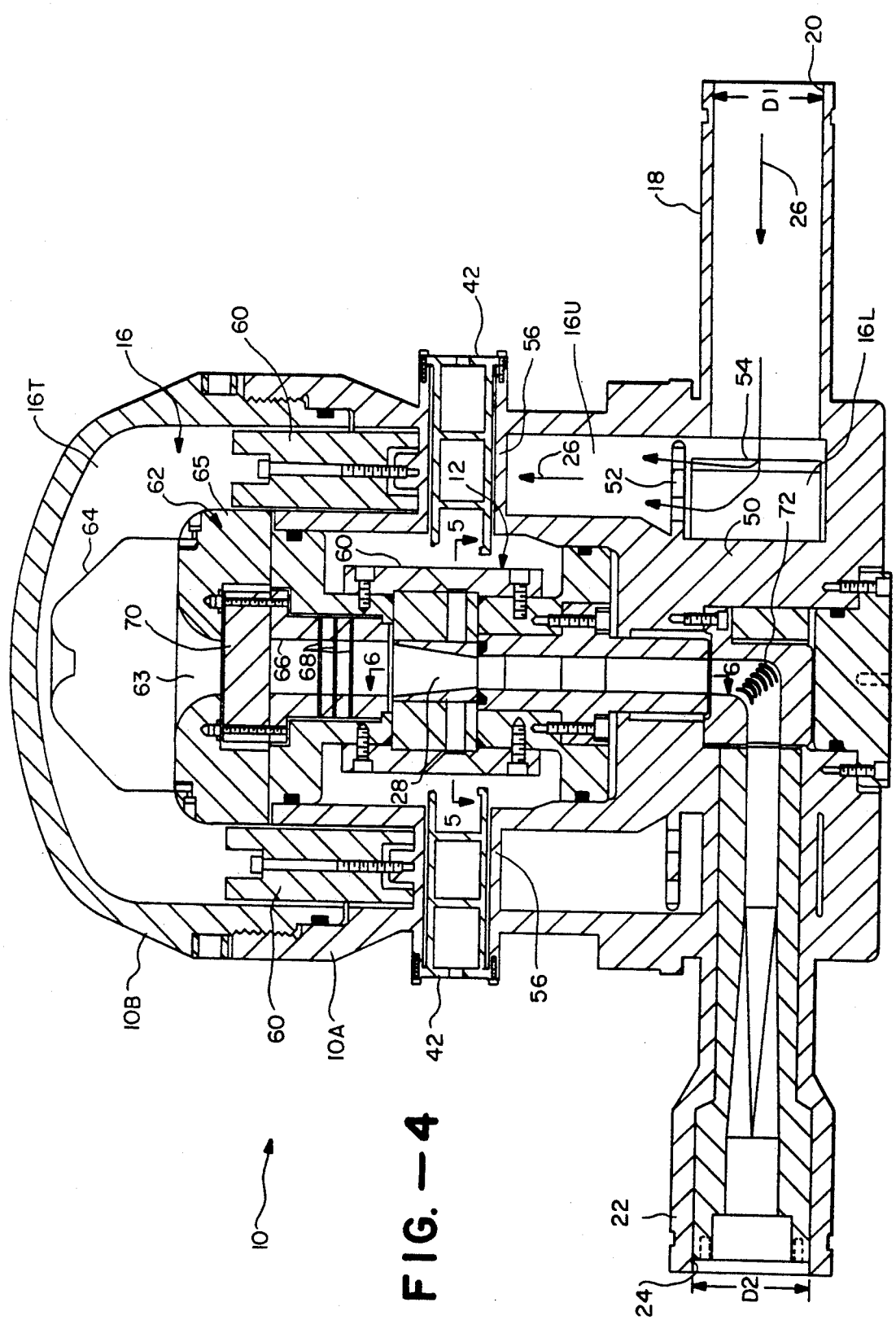
FIG. 4 is an enlarged sectional view, in side section, of the support vessel illustrated in FIGS. 1-3, particularly illustrating its internal components and a dye cell assembly which also forms part of the overall dye laser amplifier.

Having described the various aspects of the present invention, attention is now directed to FIGS. 4-6 for a discussion of the detailed structure making up the vessel and dye cell assembly. Referring particularly to FIG. 4, the main body 10A is shown including pipe means 18 defining an inlet 20 having a diameter D1 and pipe means 22 defining an outlet 24 having a diameter D2. Note that the diameter D1 is smaller than the diameter D2. As discussed previously, the two diameters are selected to provide equal static forces at the inlet and outlet. In an actual working embodiment, D1 is equal to 2.5 inches while D2 is equal to 3 inches, as also stated previously.

As shown in FIG. 4, inlet tube 18 leads into previously recited vessel chamber 16 which at its lower end surrounds a dye cell support structure 50 integrally formed with vessel body 10A. The dye cell support structure carries with it a flow spreader ring 52 which extends radially outward into the vessel chamber just above inlet 20. A spliter plate 54 is disposed directly under the flow spreader at the inlet entrance. As dye stream 26 enters the vessel chamber through inlet 20 it is first caused to flow around the entire support structure 50 and the lower annular section or region 16L of vessel chamber 16. Thereafter it passes up through the flow spreader ring into an upper annular section or region 16U of chamber 16. The flow spreader ring serves to distribute the flow into the upper annular region 16U from the lower annular region 16L so that the flow upward is uniform around support structure 50.

Stream 26 continues to flow upward in upper annular region 16U toward the top region 16T of chamber 16 and, in doing so, must pass four horizontally extending, equally circumferentially spaced pipes, two of which are shown in FIG. 4. The pipes so shown are generally indicated at 56 and serve to define the previously recited openings 42 for accommodating passage of dye beam 34, 36 as the latter passes through the support vessel and dye cell 28. The other two pipes are shown at 58 in FIG. 6 and serve to define previously recited openings 40 for accommodating passage of the copper vapor laser beams 30 into the dye cell assembly. In order to insure that the dye stream flow passes these four pipes in a smooth manner as it enters top region 16T of chamber 16, a flow vane 60 is mounted directly above each pipe so that there are four vanes in all, although only two are shown. While each of these vanes is shown somewhat rectangular in cross-section, in side section each is wedge shaped with its base somewhat rounded to conform to and rest on a cooperating segment of the outer surface of its associated pipe while its top end is pointed upward.

The three chamber sections or regions 16L, 16U and 16T together make up overall storage chamber 16. As stated previously, this overall chamber is preferably substantially larger in cross-section and volume than the volume of the dye chamber in order to serve as a settling and thermal mixing chamber for stream 26 as the latter enters the vessel from inlet 20 and before it enters the dye cell.

After the dye stream passes into region 16T of vessel chamber 16 it is directed into the inlet of dye cell assembly 14. The dye cell assembly is comprised of a dye cell 12 defining previously recited dye chamber 28, a cap arrangement 62 defining an inlet 63 into the dye cell and a screen 64. The dye cell 12 is supported in an non-rigid structural fashion by and partially within dye cell support arrangement 50, as illustrated in FIG. 4 so that its dye chamber 28 is in appropriate optical communication with the openings 40 and 42, thereby allowing the dye beam to enter and pass through the dye chamber and allowing the CVL beams to enter the dye chamber at the same time. The cap arrangement 62 includes a top cap 64 and inlet duct 66 which supports turbulence reducing screens 68 and a honeycomb flow straightener 70. In order to remove the dye cell from the support vessel, it is only necessary to disconnect the top cap 10B forming part of the vessel from its main body 10A, remove the bolts attaching 65 to 50, and thereafter lift out the combination screen 64 and cap arrangement 62. This makes the dye cell itself readily accessible so that it can be pulled out of its position within support arrangement 50. Note that the dye cell assembly is not an integral rigid structural member of the support vessel 10A. There are however a number of different o-rings which serve to seal the various components in position when the dye cell assembly is in place. In this latter regard, while the dye cell assembly is not structurally connected to the rest of the support vessel, it is designed to fit in place in a snug, seal engaging fashion.

With the dye cell assembly 14 in its operating position, as shown in FIG. 4, dye stream 26 enters inlet 63 through screen 64. This latter application is incorporated herein by reference. However, briefly, the screen is designed to cause stream 26 to enter inlet 63 in a smooth controlled manner with substantially no stagnation at the top of region 16T. Once the stream enters inlet 63 it is passes through honeycomb flow straightener 70, turbulence reducing screens 68 and into and through dye chamber 28. Thereafter, it flows out of the dye cell and past a high speed vane corner 72 and out through outlet 24. As indicated previously, the static outlet pressure (at outlet 24) is substantially lower than the static inlet pressure (inlet 20). However, in a preferred embodiment, the inlet area, as defined by diameter D2, is larger than the inlet area, as defined by diameter D1, such that static inlet and outlet forces are equal. At the same time, as stated previously, the inlet and outlet are symmetrically located relative to the overall support vessel so as to place relatively low hydrodynamic bending moments on the overall vessel structure.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a dye laser amplifier in which a continuous replenished supply of dye is excited by a first light beam in order to amplify the intensity of a second different light beam passing through the dye, said amplifier including a dye cell defining a dye chamber through which a continuous stream of dye is caused to pass, means for directing said second beam into and through said chamber, and means for directing said continuous stream of dye through said chamber, the improvement comprising a specifically designed support vessel for containing said dye cell, said vessel including:
   (a) means including a first opening into the vessel for accommodating passage of said first beam into said dye chamber:
   (b) means including a pair of second openings into said vessel for accommodating the passage of said second beam through said dye chamber; and
   (c) means defining a vessel chamber through which said continuous stream of dye must pass before entering said dye cell, an inlet for accommodating passage of said stream into said vessel chamber before entering said dye cell and an outlet for accommodating passage of said stream out of said vessel after leaving said dye cell, said vessel chamber being substantially larger in cross-section than both said vessel inlet and said dye chamber and substantially larger in volume than the volume of said dye chamber whereby to serve as a settling and thermal mixing chamber for said stream as the latter enters the vessel from its inlet and before it enters the dye cell, the area ratio between said vessel chamber and said dye chamber being at least approximately 225:1.

2. In a dye laser amplifier in which a continuous replenished supply of dye is excited by a first light beam in order to amplify the intensity of a second different light beam passing through the dye, said amplifier including a dye cell defining a dye chamber through which a continuous stream of dye is caused to pass, means for directing said first beam into said chamber, means for directing said second beam into and through said chamber, and means for directing said continuous stream of dye through said chamber, the improvement comprising a specifically designed support vessel for containing said dye cell, said vessel including:
   (a) means including a first opening into the vessel for accommodating passage of said first beam into said dye chamber:
   (b) means including a pair of second openings into said vessel for accommodating the passage of said second beam through said dye chamber; and
   (c) means defining a vessel chamber through which said continuous stream of dye must pass before entering said dye cell, an inlet for accommodating passage of said stream into said vessel chamber before entering said dye cell, and an outlet for accommodating passage of said stream out of said vessel after leaving said dye cell, said dye cell being contained within said vessel without being connected to said vessels at all, whereby said dye cell can be readily removed from said vessel.

3. In a dye laser amplifier in which a continuous replenished supply of dye is excited by a first light beam in order to amplify the intensity of a second different light beam passing through the dye, said amplifier including a dye cell defining a dye chamber through which a continuous stream of dye is caused to pass, means for directing said first beam into said chamber, means for directing said second beam into and through said chamber, and means for directing said continuous stream of dye through said chamber, the improvement comprising a specifically designed support vessel for containing said dye cell, said vessel including:
   (a) means including a first opening into the vessel for accommodating passage of said first beam into said dye chamber;
   (b) means including a pair of second openings into said vessel for accommodating the passage of said second beam through said dye chamber; and
   (c) means defining a vessel chamber through which said continuous stream of dye must pass before entering said dye cell, an inlet for accommodating passage of said stream into said vessel chamber before entering said dye cell and an outlet for accommodating passage of said stream out of said vessel after leaving said dye cell, in said amplifier being designed to operate at a particular static pressure at said vessel inlet and a lower, predetermined static pressure at said vessel outlet, said inlet and outlet being configured such that the static forces at said inlet and outlet as a result of said static pressures are substantially equal in magnitude, opposite in direction and colinear to one another whereby to substantially cancel one another out vectorally.

4. In a dye laser amplifier in which a continuous replenished supply of dye is excited by a first light beam in order to amplify the intensity of a second different light beam passing through the dye, said amplifier including a dye cell defining a dye chamber through which a continuous stream of dye is caused to pass, means for directing said second beam into and through said chamber, and means for directing said continuous stream of dye through said chamber, the improvement comprising a specifically designed support vessel for containing said dye cell, said vessel including:

(a) means including a first opening into the vessel for accommodating passage of said first beam into said dye chamber:

(b) means including a pair of second openings into said vessel for accommodating the passage of said second beam through said dye chamber; and (c) means defining a vessel chamber through which said continuous stream of dye must pass before entering said dye cell, an inlet for accommodating passage of said stream into said vessel chamber before entering said dye cell and an outlet for accommodating passage of said stream out of said vessel after leaving said dye cell, said vessel chamber being substantially larger in cross-section than both said vessel inlet and said dye chamber and substantially larger in volume than the volume of said dye chamber whereby to serve as a settling and thermal mixing chamber for said stream as the latter enters the vessel from its inlet and before it enters the dye cell, said dye cell being contained within said vessel without being connected directly with the vessel's inlet and output, whereby removal of the dye cell from the vessel does not require disengagement of the dye cell from said inlet and outlet.

5. In a dye laser amplifier in which a continuous replenished supply of dye is excited by a first light beam in order to amplify the intensity of a second different light beam passing through the dye, said amplifier including a dye cell defining a dye chamber through which a continuous stream of dye is caused to pass, means for directing said second beam into and through said chamber, and means for directing said continuous stream of dye through said chamber, the improvement comprising a specifically designed support vessel for containing said dye cell, said vessel including:

(a) means including a first opening into the vessel for accommodating passage of said first beam into said dye chamber:

(b) means, including a pair of second openings into said vessel for accommodating the passage of said second beam through said dye chamber; and (c) means defining a vessel chamber through which said continuous stream of dye must pass before entering said dye cell, an inlet for accommodating passage of said stream into said vessel chamber before entering said dye cell and an outlet for accommodating passage of said stream out of said vessel after leaving said dye cell, said vessel chamber being substantially larger in cross-section than both said vessel inlet and said dye chamber and substantially larger in volume than the volume of said dye chamber whereby to serve as a settling and thermal mixing chamber for said stream as the latter enters the vessel from its inlet and before it enters the dye cell, said amplifier being designed to operate at a predetermined static pressure at said vessel inlet and a lower, predetermined static pressure at said vessel outlet and said inlet and outlet being configured such that the static forces at said inlet and outlet as a result of said static pressures are substantially equal in magnitude, opposite in direction and colinear to one another whereby to substantially cancel one another out vectorally.

6. The improvement according to claim 1 wherein the flow rate of said stream of dye through said vessel and dye chambers is at least about 30 gallons/minute.

7. The improvement according to claim 4 wherein said dye cell is contained within said vessel without being connected to said vessel at all, whereby said dye cell can be removed from said vessel without disconnecting it from the vessel.

8. The improvement according to claim 5 wherein said support vessel is physically symmetrical about a given vertical plane and wherein said inlet and outlet extend horizontally within said plane.

9. The improvement according to claim 3 wherein said support vessel is physically symmetrical about a given vertical plane and wherein said inlet and outlet extend horizontally within said plane.

* * * * *